United States Patent
Jo

(10) Patent No.: US 12,162,159 B2
(45) Date of Patent: Dec. 10, 2024

(54) MOVING ROBOT AND METHOD OF CONTROLLING THE SAME

(71) Applicant: LG ELECTRONICS INC., Seoul (KR)

(72) Inventor: Hanmin Jo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 401 days.

(21) Appl. No.: 17/624,028

(22) PCT Filed: Jul. 2, 2020

(86) PCT No.: PCT/KR2020/008680
§ 371 (c)(1),
(2) Date: Dec. 30, 2021

(87) PCT Pub. No.: WO2021/006547
PCT Pub. Date: Jan. 14, 2021

(65) Prior Publication Data
US 2022/0355481 A1    Nov. 10, 2022

(30) Foreign Application Priority Data
Jul. 5, 2019 (KR) .......................... 10-2019-0081462

(51) Int. Cl.
*B25J 9/16* (2006.01)
*A47L 9/28* (2006.01)
*B25J 13/00* (2006.01)

(52) U.S. Cl.
CPC .......... *B25J 9/1666* (2013.01); *A47L 9/2805* (2013.01); *A47L 9/2852* (2013.01); *B25J 9/1697* (2013.01); *B25J 13/003* (2013.01)

(58) Field of Classification Search
CPC .... A47L 9/2805; A47L 9/2852; B25J 9/1666; B25J 9/1697; B25J 13/003
See application file for complete search history.

(56) References Cited

U.S. PATENT DOCUMENTS

| 2005/0096790 A1 | 5/2005 | Tamura et al. |
| 2006/0129275 A1* | 6/2006 | Ogawa ................... B25J 13/003 700/245 |

(Continued)

FOREIGN PATENT DOCUMENTS

| EP | 2637073 | 9/2013 |
| EP | 2839769 | 2/2015 |

(Continued)

OTHER PUBLICATIONS

International Search Report dated Jan. 5, 2021 issued in Application No. PCT/KR2020/008680.

(Continued)

*Primary Examiner* — Edwin A Young
(74) *Attorney, Agent, or Firm* — KED & ASSOCIATES, LLP

(57) ABSTRACT

According to a moving robot and a method of controlling the same of the present disclosure, the moving robot detect the sound generated in the area, moves a sound generation point according to a type of the sound and an operation mode, analyzes an image of the sound generation point and determines an indoor situation to perform the corresponding operation. The moving robot detects the sound to determine an accident at a location at which the sound is generated, can automatically perform a specified operation corresponding to the generated accident even when there is no control command of a user, and thus, it is possible rapidly respond to the generated accident. The moving robot can divide an object generating the sound into a person, a companion animal, and a subject, and can perform different operations according to the object.

19 Claims, 10 Drawing Sheets

(56) References Cited

U.S. PATENT DOCUMENTS

| | | | | |
|---|---|---|---|---|
| 2013/0232717 A1* | 9/2013 | Lee | ............... | G08B 13/19695 |
| | | | | 901/1 |
| 2015/0063069 A1* | 3/2015 | Nakadai | ............... | G01S 3/802 |
| | | | | 367/118 |
| 2016/0291595 A1* | 10/2016 | Halloran | ............... | A47L 11/40 |

FOREIGN PATENT DOCUMENTS

| | | |
|---|---|---|
| EP | 3342324 | 7/2018 |
| JP | 2018-517966 | 7/2018 |
| JP | 2019-103073 | 6/2019 |
| KR | 10-2001-0106845 | 12/2001 |
| KR | 10-2013-0103204 | 9/2013 |
| KR | 10-2015-0086074 | 7/2015 |
| KR | 10-2016-0138632 | 12/2016 |
| KR | 10-2017-0048815 | 5/2017 |
| KR | 10-2019-0010303 | 1/2019 |

OTHER PUBLICATIONS

Korean Notice of Allowance dated Jun. 28, 2021 issued in Application No. 10-2019-0081462.

Extended European Search Report dated Jun. 30, 2023 issued in Application No. 20836875.3.

* cited by examiner

[Fig. 1]
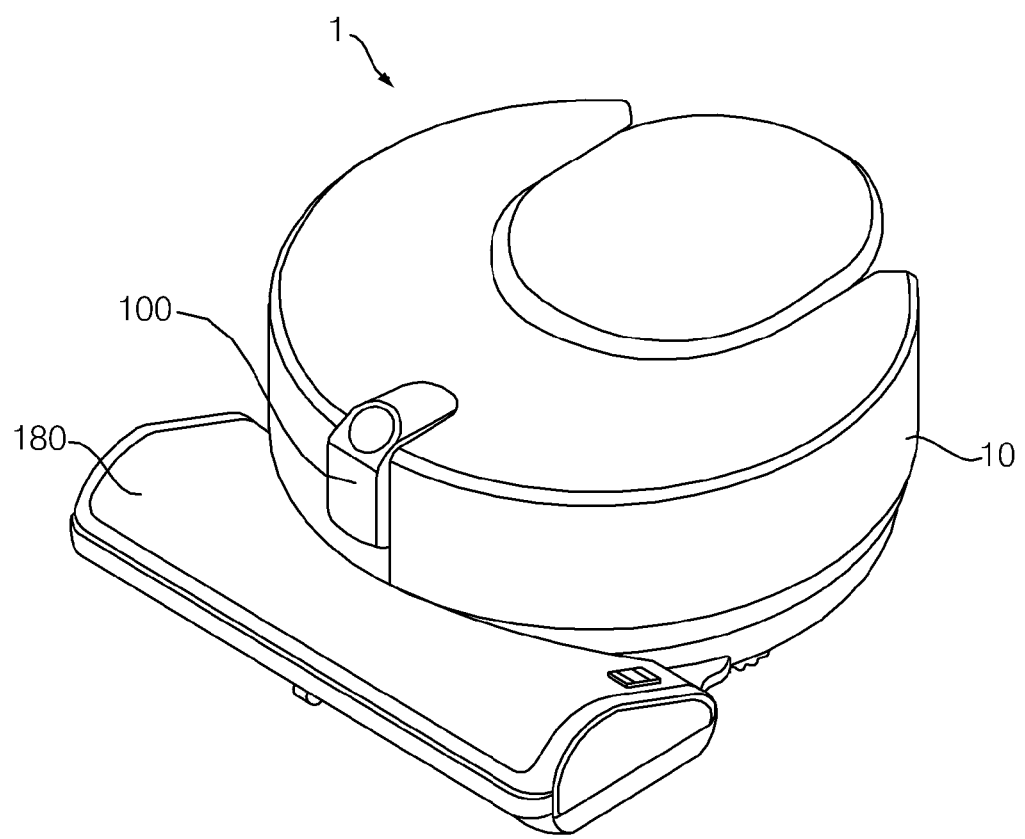

[Fig. 2]
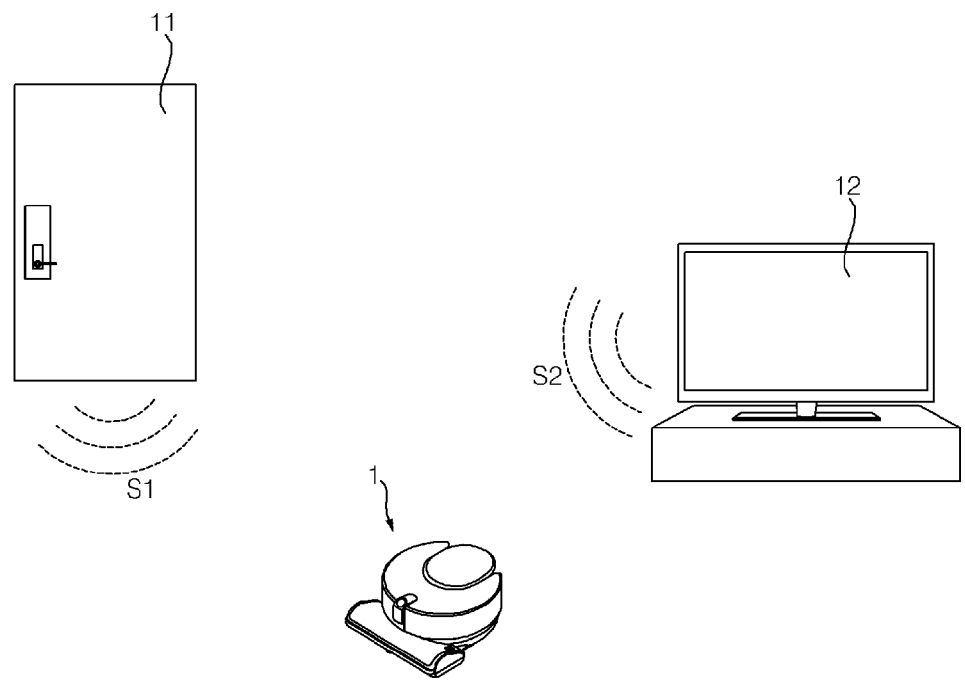
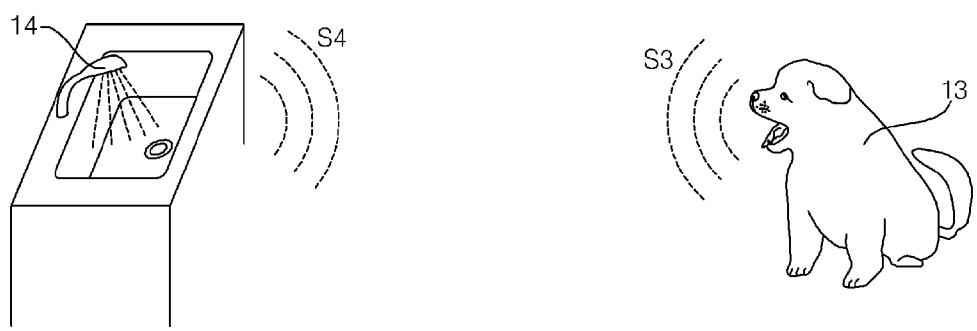

[Fig. 3]
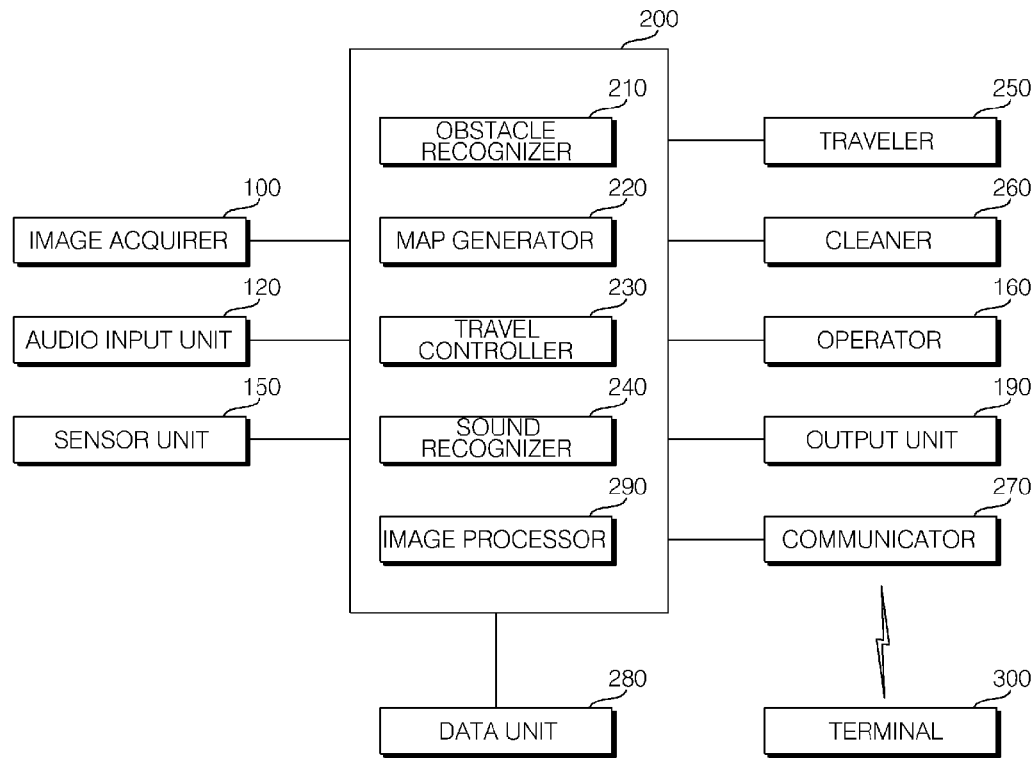
[Fig. 4]
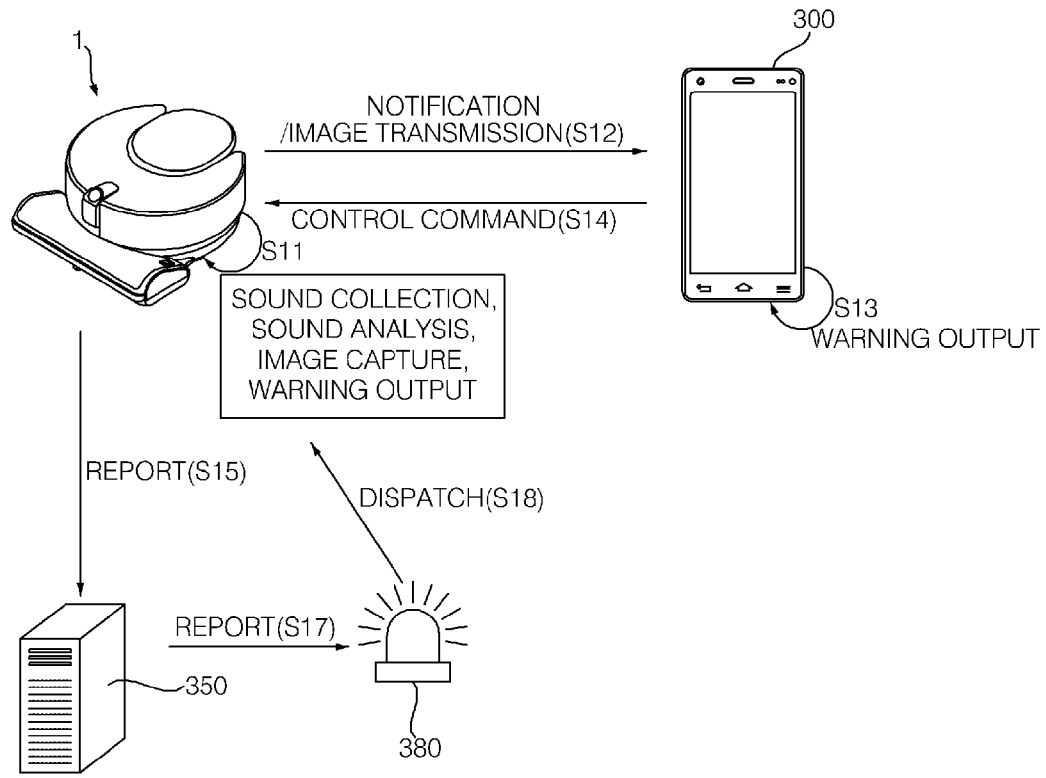

[Fig. 5]
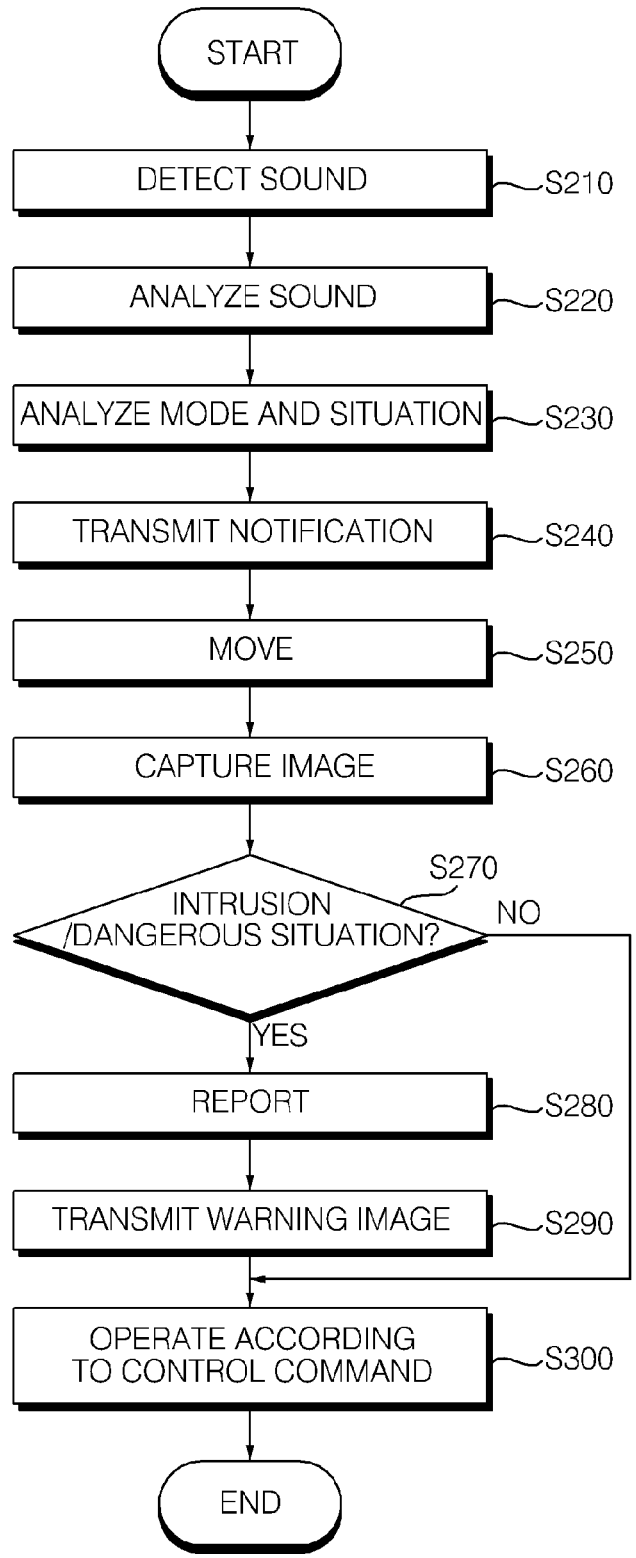

FIG. 6
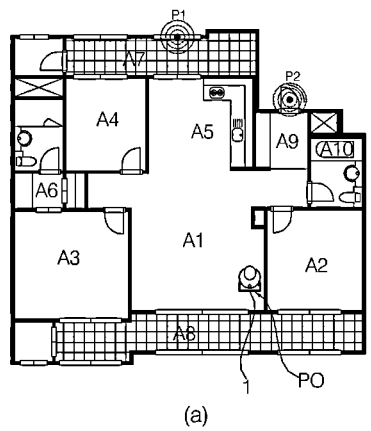
(a)
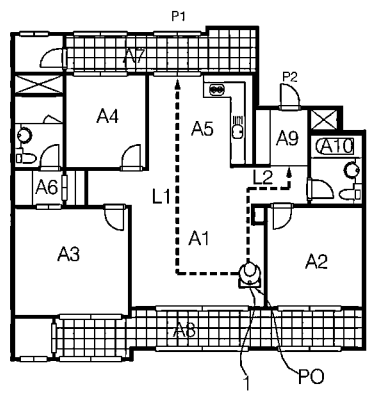
(b)
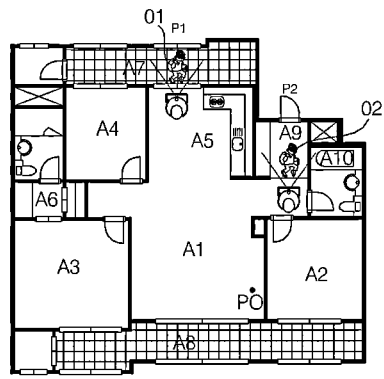
(c)

[Fig. 7]
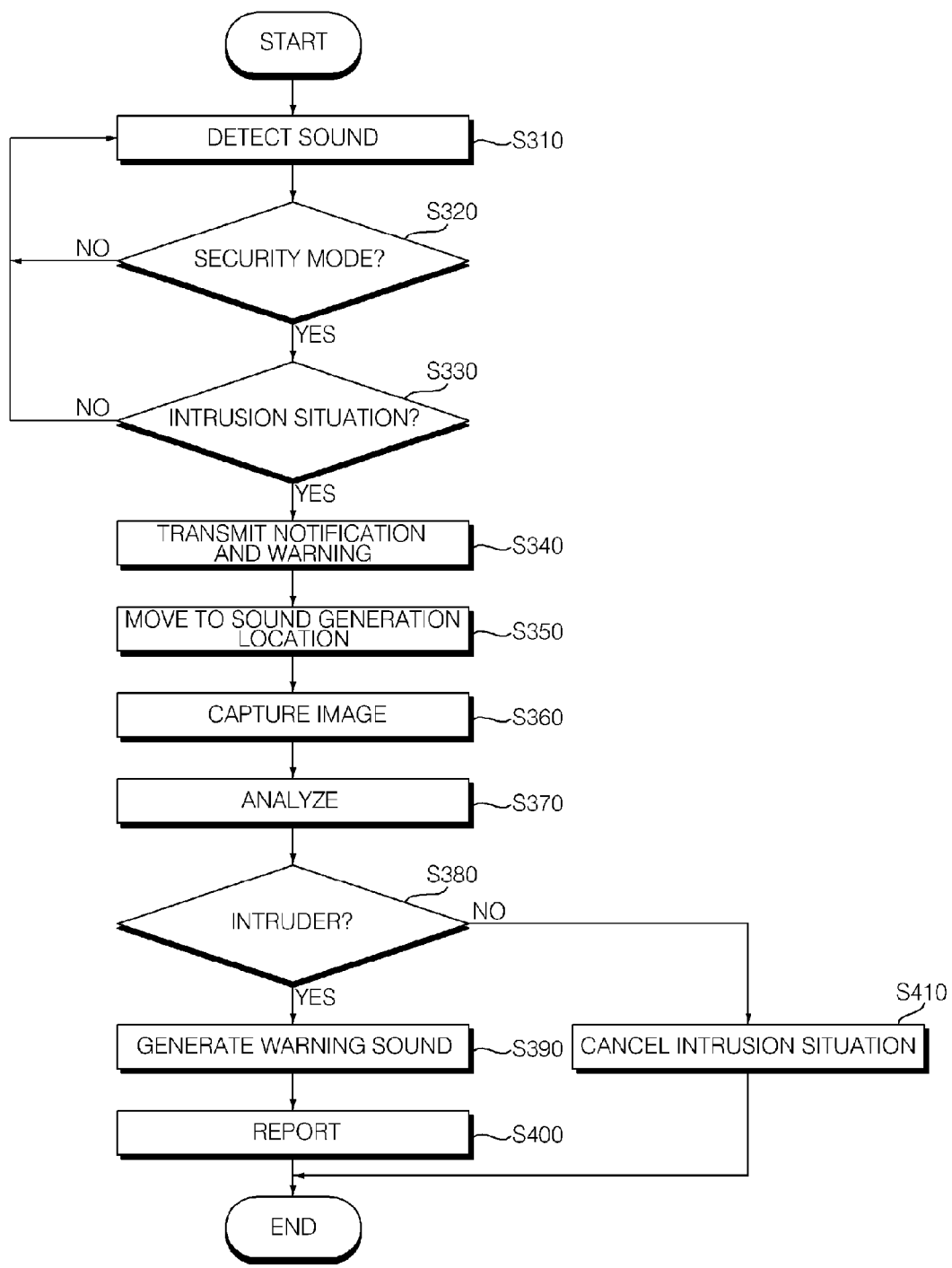

[Fig. 8]
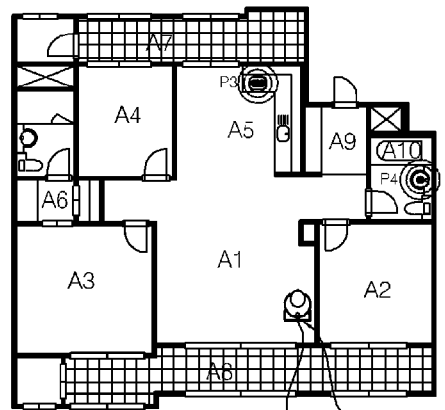
(a)
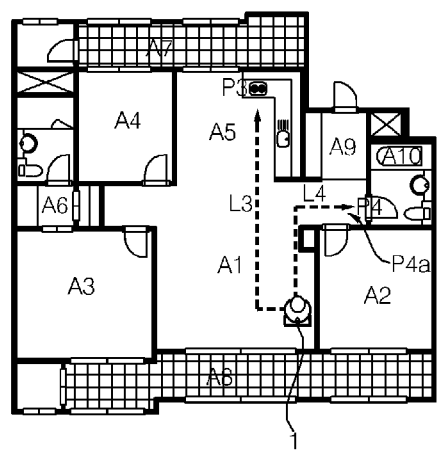
(b)
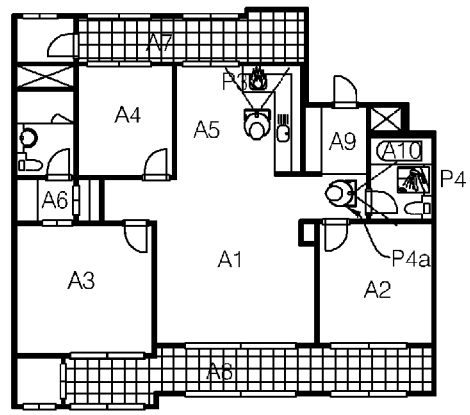
(c)

[Fig. 9]
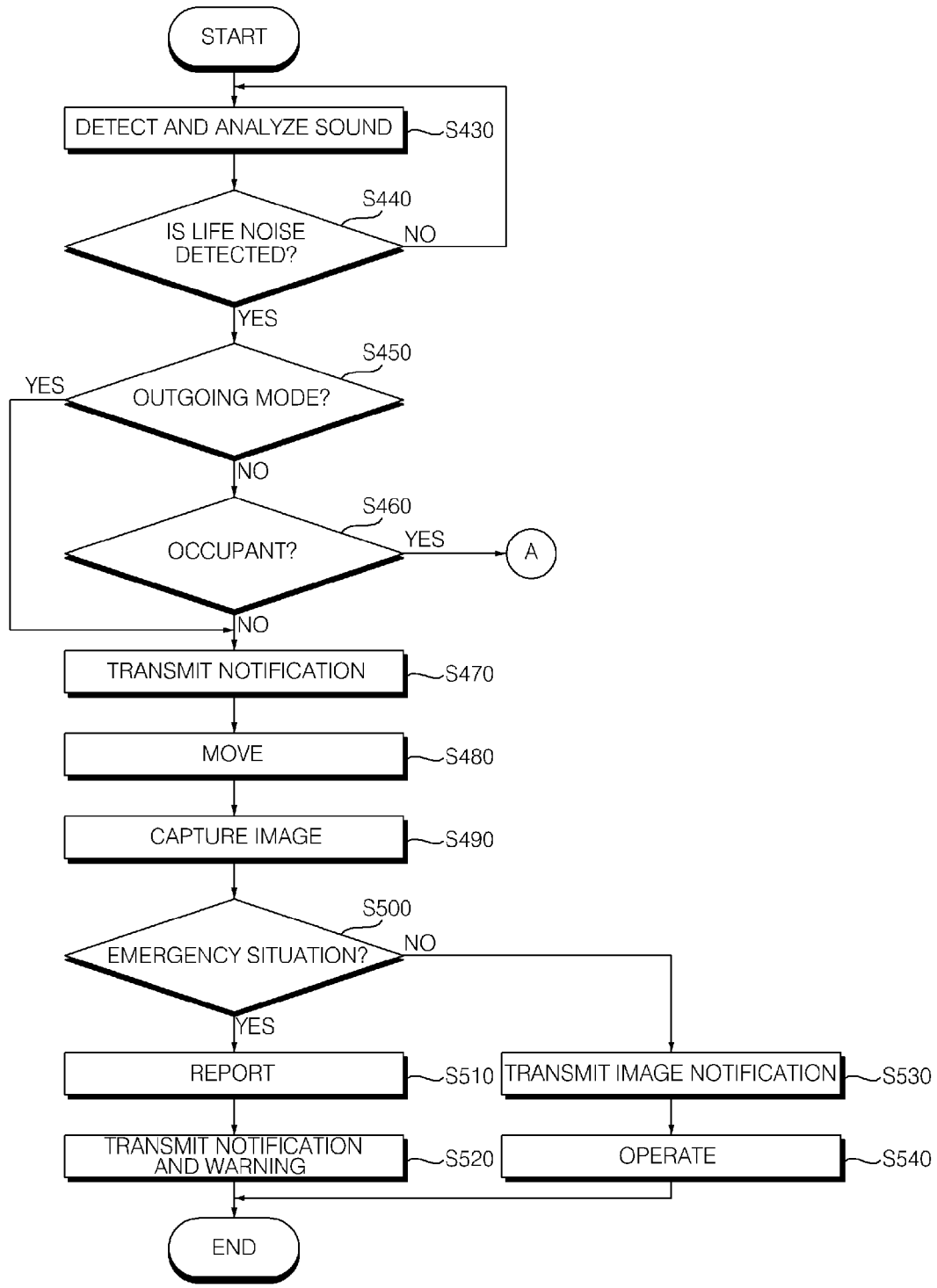

FIG. 10
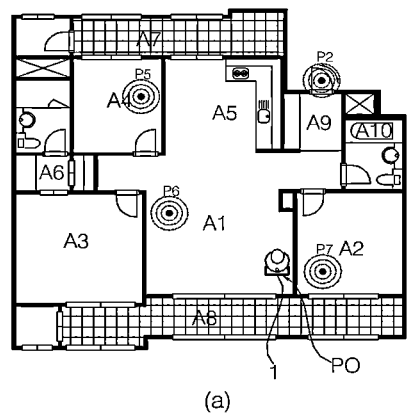
(a)
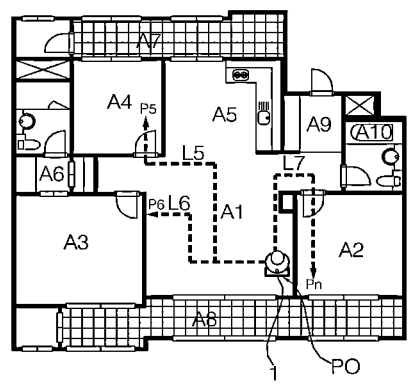
(b)
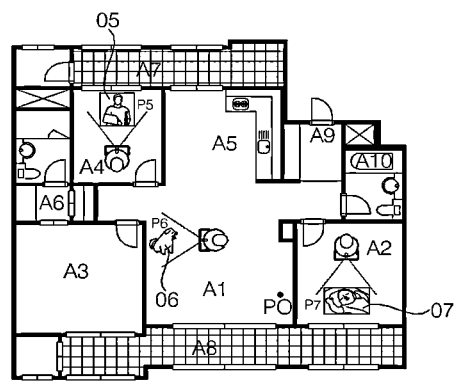
(c)

[Fig. 11]
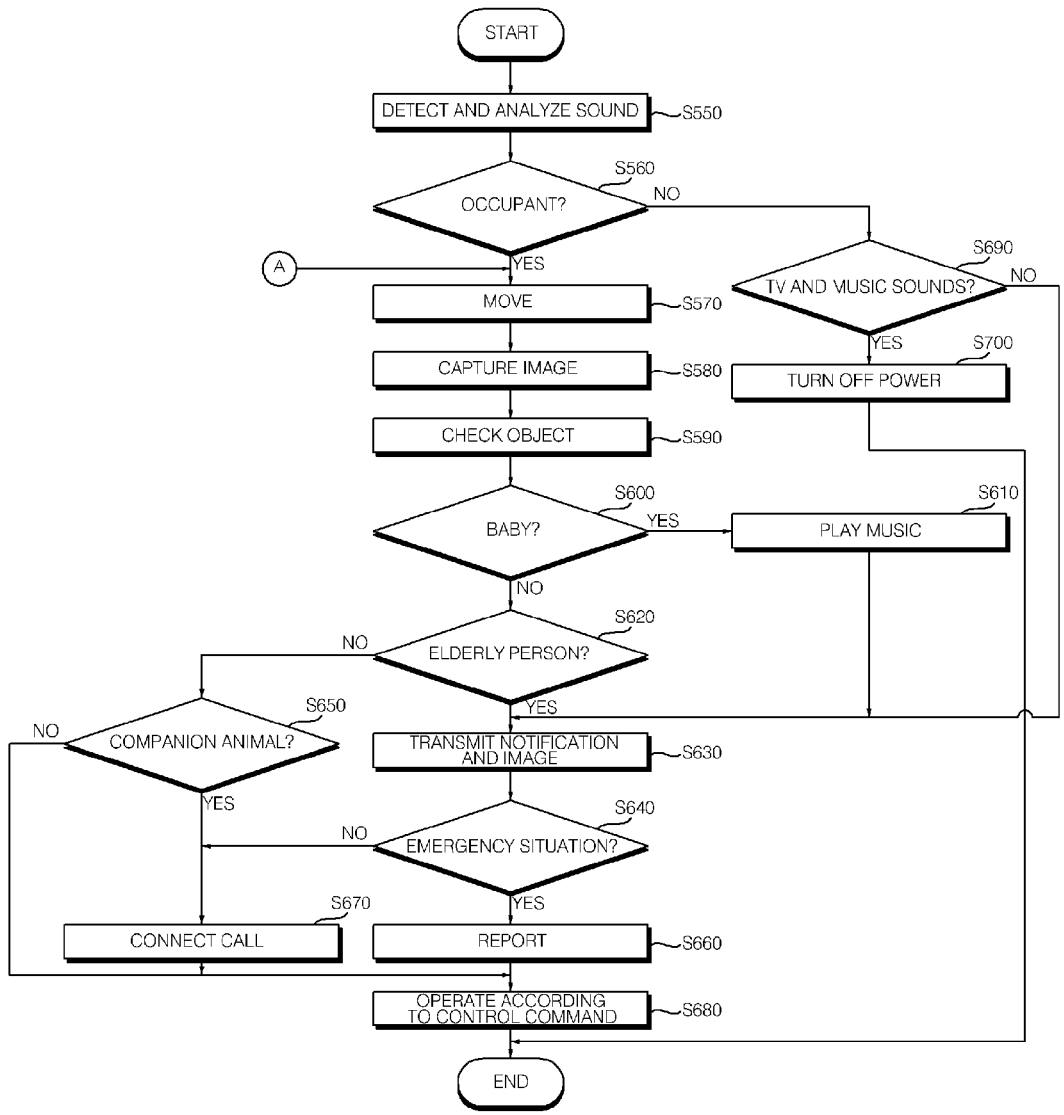

MOVING ROBOT AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2020/008680, filed Jul. 2, 2020, which claims priority to Korean Patent Application No. 10-2019-0081462, filed Jul. 5, 2019, whose entire disclosures are hereby incorporated by reference.

TECHNICAL FIELD

The present disclosure relates to a moving robot and a method of controlling the same, and particularly, to a moving robot which travels according to a sound generated in an area and performs a specified operation and a method of controlling the same.

BACKGROUND ART

In general, a moving robot self-travels within an area and performs a specified operation.

In recent years, the moving robot is used in various forms such as a guide robot, a cleaning robot, a mowing robot, a security patrol robot, and a translation robot. For example, a cleaning robot sucks foreign substances such as dust from a bottom surface and automatically performs the cleaning.

The moving robot may create a map for an area while traveling the corresponding area. The moving robot may travel the area based on the generated map.

Korean Laid-Open Patent Application No. 10-2015-0086074 discloses a human care method of a robot cleaner. The robot cleaner includes a main body having a cleaning module, a driver for moving the main body, an image generator for generating image information of a management target, a communicator which is provided to communicate with an external communication means and transmits the image information to the external communication means, and a controller which recognizes the management target and performs a control so that the management target is included in the image information according to a location change of the management target.

The robot cleaner recognizes the management target to capture an image for the management target and transmits the captured image information to an outside.

The robot cleaner recognizes the management target and captures the image while moving along with a movement of the management target to transmit the captured image to the outside. Accordingly, the robot cleaner can check a state of the management target through an external terminal.

The robot cleaner of the related art captures the image and transmits the captured image, and thus, can check the state of the management target. However, the robot cleaner is limited only to capture the image for the management target, and thus, is limited to only monitoring of the management target.

Even when a problem occurs, the robot cleaner simply performs the capturing, and thus, there is a limitation because the robot cleaner does not include a content for a practical human care.

Accordingly, a method of going beyond a simple monitoring operation, checking a state of the subject, performing an operation corresponding to the checking, immediately responding to a danger or an emergency situation to perform a necessary operation on the subject, and thus, performing a practical care is necessary.

DISCLOSURE OF INVENTION

Technical Problem

The present disclosure provides a moving robot and a method of controlling the same capable of detecting an accident occurring in a set area to perform a specified operation.

The present disclosure provides a moving robot and a method of controlling the same capable of collecting and analyzing a sound generated in an area, moving a location where the sound is generated to determine a situation where the sound is generated, and performing an operation corresponding to the determination.

The present disclosure provides a moving robot and a method of controlling the same capable of recognizing and analyzing an object which generates a sound in an area and performing an operation corresponding to the object and the accident situation.

The present disclosure provides a moving robot and a method of controlling the same capable of dividing an object such as children, an elderly person, and a companion animal, as well as water facilities and craters so as to manage a plurality of objects.

Solution to Problem

The present disclosure provides a moving robot and a method of controlling the same capable of detecting a sound generated in an area to determine an accident in the area.

In the present disclosure, the moving robot determines a sound generation point through the detected sound and moves, and determines an accident generated at the corresponding location.

In the present disclosure, the moving robot recognize an object generating the sound through the detected sound, and performs a specific operation depending on the object generating the sound.

In the present disclosure, the moving robot analyzes a cause of a sound occurrence to determine an environment change in the area, detects the accident corresponding the environment change and reports the accident.

In the present disclosure, the moving robot divides the object into a person and a companion animal and performs an operation corresponding to the object.

In the present disclosure, the moving robot captures an image at the sound generation point, transmits the image to a designation terminal, and performs a specific operation or reports to a designated contact according to the cause of the sound occurrence and the object.

In an aspect of the present disclosure, there is provided a moving robot including: a main body configured to travel an area; a sensor unit configured to include a plurality of sensors and detects an obstacle or a movement; an audio input unit to configured to collect a sound; a sound recognizer configured to analyze the sound collected by the audio input unit and determine a type of the sound; an image acquirer configured to capture an image; and a controller configured to cause the main body to move to a sound generation point according to the type of the sound and an operation mode, analyze the image captured by the image acquirer at the sound generation point to determine an indoor situation, and performs an operation corresponding to the indoor situation.

In another aspect of the present disclosure, there is provided a method of controlling a moving robot, including: detecting, by an audio input unit, a sound generated in an area; analyzing the sound to determine a type of the sound; moving the moving robot to a sound generation point according to the type of the sound and an operation mode; capturing an image for the sound generation point; and analyzing the image to determine an indoor situation and performing an operation corresponding to the indoor situation.

Advantageous Effects of Invention

According to the moving robot and the method of controlling the same of the present disclosure, the moving robot can detect the sound generated in the area and determine the accident at the location at which the sound is generated.

According to the present disclosure, the moving robot can perform the specified operation corresponding to the sound detected in the specific operation mode.

According to the present disclosure, the moving robot collects the sound even in the normal mode in which the specific operation mode is set, and can determine the accident with respect to the environment change, the state of the person, and the change of the material within the area.

According to the present disclosure, even when the user does not check the data transmitted from the moving robot, the moving robot can automatically perform the specified operation according to the generated accident.

According to the present disclosure, the moving robot performs the operation corresponding to the generated sound, and thus, it is possible to rapidly respond to the generated accident.

According to the present disclosure, the moving robot can divide the object generating the sound into the person, the companion animal, and the subject, and can perform different operations according to the object.

According to the present disclosure, the moving robot can determine the occurrence of the accident according to the generated sound.

According to the present disclosure, the moving robot moves to the location at which the sound is generated to capture the image, and thus, the user can check the scene of the accident.

According to the present disclosure, the moving robot can check the state with respect to the designated object to perform the operation corresponding to the state.

BRIEF DESCRIPTION OF DRAWINGS

FIG. 1 is a perspective view illustrating a moving robot according to an embodiment of the present disclosure.

FIG. 2 is an exemplary view for explaining a sound detection object of the moving robot according to the embodiment of the present disclosure.

FIG. 3 is a block diagram schematically illustrating a configuration of the moving robot according to the embodiment of the present disclosure.

FIG. 4 is a diagram for explaining a signal flow according to an operation of the moving robot according to the embodiment of the present disclosure.

FIG. 5 is a flowchart illustrating a method in which the moving robot according to the embodiment of the present disclosure detects a sound and controls an operation.

FIGS. 6A to 6C are views illustrating an embodiment of an operation according to a security mode setting of the moving robot according to the embodiment of the present disclosure.

FIG. 7 is a flowchart illustrating a control method according to the security mode setting of the moving robot according to the embodiment of the present disclosure.

FIGS. 8A to 8C are views illustrating an embodiment of an operation of the moving robot according to the embodiment of the present disclosure with respect to a life noise.

FIG. 9 is a flowchart illustrating a control method of the moving robot according to the embodiment of the present disclosure with respect to the life noise.

FIGS. 10A to 10C are views illustrating an embodiment of an operation when the moving robot according to the embodiment of the present disclosure detects an occupant.

FIG. 11 is a flowchart illustrating a control method of the moving robot according to the embodiment of the present disclosure when the moving robot detects the occupant.

MODE FOR THE INVENTION

Advantages and features of the present disclosure and a method for achieving the advantages and features will become apparent by referring to an embodiment described below in detail with reference with the accompanying drawings. However, the present disclosure is not limited to the embodiment disclosed below, but may be implemented in various different forms. That is, the present embodiment is provided to make the present disclosure to be complete and to fully inform a person having ordinary knowledge in the technical field to which the present disclosure belongs of the scope of the disclosure, and the present disclosure is only defined by the scope of the claims. The same reference numerals indicate the same constituent elements through the entire specification. A control configuration of the present disclosure may be constituted by at least one processor.

FIG. 1 is a perspective view illustrating a moving robot according to an embodiment of the present disclosure.

Referring to FIG. 1, a moving robot 1 according to an embodiment of the present disclosure includes a main body 10 which moves in an area and performs a specified operation, and a detecting means which is disposed on a front surface of the main body 10 and detects an obstacle.

Hereinafter, a cleaning robot configured to suck foreign substances such as dust on a floor while the moving robot travels is described as an example, but any other robot capable of performing autonomous traveling is applicable.

The main body 10 may include a casing (not illustrated) which forms an exterior and forms a space in which parts constituting the main body 10 are accommodated and a left wheel (not illustrated) and a right wheel (not illustrated) which are provided rotatably in the casing. As the right and left wheels rotate, the main body 10 moves along a bottom of an area.

The main body 10 may include a traveler (not illustrate) which drives the right wheel and the left wheels. The traveler may include at least one drive motor.

A control panel including an operator (not illustrated) for receiving various commands to control the moving robot 1 from a user is provided on an upper surface of the casing.

The detecting means includes a sensor unit (not illustrated) which includes a plurality of sensors and an image acquirer 100 which captures an image, and detects an obstacle located in a traveling direction.

The image acquirer 100 may include at least one camera, captures an image by a camera, and can detect the obstacle from the captured image.

The image acquirer 100 may be disposed on a front surface of the main body 10.

The image acquirer 100 captures an image in the traveling direction of the moving robot 1. The image acquirer 100 may capture a front or a ceiling in the traveling direction. The image acquirer 100 may be provided to face the ceiling, or may be provided toward forward to capture the front in the traveling direction.

Moreover, according to an installation location of the image acquirer 100 and an installation angle in the traveling direction in the main body 10, the image acquirer 100 may simultaneously capture the front in the traveling direction and the upward side, that is, the ceiling in the traveling direction. In the image acquirer, an angle of view captured may be set differently according to performance of the installed camera or a type of lens.

The image acquirer 100 is described as an example in which at least one camera is included, and any image acquisition means for capturing an image regardless of a type of the camera can be applied.

The image acquirer 100 may include a plurality of cameras, and two cameras facing the front and the ceiling may be respectively installed on the front surface and an upper end portion of the main body so as to capture the images of the front and the ceiling, respectively. In addition, the image acquirer 100 may separately include a camera which captures the bottom surface.

The sensor unit 150 may include an infrared sensor, an ultrasonic sensor, and a laser sensor to detect the obstacle. The sensor unit may include a 3D sensor which irradiates an image with a light pattern and detects an obstacle through the captured image.

In addition, for example, the sensor unit 150 may include an inclination sensor such as a tilting sensor or a gyro sensor to detect an inclination of the main body 10, and may include an illuminance sensor to detect brightness of the area where the main body 10 is located.

The moving robot 1 may further include a location acquiring means (not illustrated) for obtaining current location information. The moving robot 1 includes a GPS and a UWB to determine a current location.

For example, the moving robot for cleaning is configured to suck foreign substances such as dust on the bottom during the traveling. The moving robot includes a suction unit 180 which is disposed in the casing to suck the foreign substances such as dust or garbage, and the foreign substances are sucked through the suction unit (not illustrated) formed toward the bottom surface during cleaning.

The suction unit 180 may include a suction fan (not illustrated) for generating suction power, and a suction port (not illustrated) through which an airflow generated by rotation of the suction fan is sucked. The suction unit 180 may include a filter (not illustrated) for collecting the foreign substances from the airflow sucked through the suction port, and a foreign substance collection container (not illustrated) in which the foreign substances collected by the filter is accumulated.

The suction unit 180 includes a rotating brush (not illustrated), and the rotating brush is rotated when the suction unit sucks the airflow to assist the collection of the foreign substances. The suction unit is configured to be detachable as necessary. The main body 10 may further includes a plurality of brushes (not illustrated) which are located on a front side of a bottom surface of the casing, and have brushes including a plurality of blades extending radially.

A damp floorcloth cleaner may be attached to and detached from the suction unit 180. The damp floorcloth cleaner may be mounted on a rear surface of the suction port. In some cases, the damp floorcloth cleaner may be configured separately from the suction unit and can be replaced and mounted at a location fastened to the suction unit. The damp floorcloth cleaner rotates while moving and wipes the bottom surface in a traveling direction.

The main body 10 may further includes a plurality of brushes (not illustrated) which are located on the front side of the bottom surface of the casing, and have brushes including the plurality of blades extending radially. The plurality of brushes are rotated to remove the dust from the bottom of the area to be cleaned, and thus, the dust separated from the bottom is sucked through the suction port and is collected in the collection container.

The main body 10 includes a rechargeable battery (not illustrated). A charging terminal (not illustrated) of the battery is connected to a commercial power source (for example, a power outlet in home), or the main body 10 docks with a separate charging stand connected to the commercial power source and the charging terminal is electrically connected to the commercial power source through a contact with a terminal of the charging stand, and thus, charging of the battery may be performed. Electric components constituting the moving robot 1 can be supplied with power from the battery, and thus, the moving robot 1 in which the battery is charged can self-travel in a state where the moving robot is electrically separated from the commercial power source.

Hereinafter, the moving robot 1 will be described as an example of the moving robot for cleaning, but is not limited to this, and a robot which autonomously travels an area and detects sound is applicable.

FIG. 2 is an exemplary view for explaining a sound detection object of the moving robot according to the embodiment of the present disclosure.

As illustrated in FIG. 2, the moving robot 1 detects a sound generated within an area.

The moving robot 1 may collect and analyze he sound through the audio input unit to determine a type of the sound.

The moving robot 1 may perform a division between the areas, and simultaneously, detect a sound S1 generated from a door 11 connecting the areas to each other through an opening or closing operation. The moving robot 1 may detect sounds such as a sound generated when a swing door is closed, a sound generated when a sliding door is opened or closed, a button sound of a door lock, or a sound effect caused by the opening or closing of a door.

The moving robot 1 may detect a sound S2 of home appliances 12.

The moving robot 1 can detect sound generated by home appliances such as a television (TV), an audio device, a refrigerator, a washing machine, a dryer, an air cleaner, an air conditioner, a vacuum cleaner, and a microwave oven.

The moving robot 1 may detect a life noise S4 such as a sound 14 of water, a warning sound of a boiler, a sound generated when glass breaks, and a sound of a fire warning sound.

In addition, the moving robot 1 may detect a sound of an occupant and a sound S3 of a companion animal 13.

In the case of a person, the moving robot 1 divides a voice including sound information which can divide the person and the companion animal. For example, the moving robot 1 can divide voices of a man and a woman, voices of a baby and an old man, a sound of a person's laugh, a sneeze sound, and a cry. In addition, the moving robot 1 may also recognize and divide voices for each user through separate voice registration.

The moving robot 1 may detect a sound of a species for the companion animal, for example, sounds of a dog and a cat.

FIG. 3 is a block diagram schematically illustrating a configuration of the moving robot according to the embodiment of the present disclosure.

As illustrated in FIG. 3, the moving robot 1 includes a traveler 250, a cleaner 260, a data unit 280, an audio input unit 120, an image acquirer 100, a sensor unit 150, a communicator 270, an operator 160, an output unit 190, and a controller 200 for controlling all operations.

The operator 160 includes input means such as at least one button, a switch, or a touch pad to receive a command of the user. The operator may be provided in the upper end portion of the main body 10, as described above.

The output unit 190 has a display such as an LED or an LCD, and displays an operation mode, reservation information, a battery state, an operation state, and an error state of the moving robot 1. In addition, the output unit 190 includes a speaker or a buzzer, and outputs a predetermined sound effect, warning sound, or voice guidance corresponding to the operation mode, the reservation information, the battery state, the operation state, and the error state.

The audio input unit 120 includes at least one microphone, and receives a sound which is generated from a periphery within a certain distance from the main body 10 or generated within an area.

The audio input unit 120 may further include a signal processor (not illustrated) which filters, amplifies and converts the input sound.

In the data unit 280, an acquired image input from the image acquirer 100 is stored, reference data for an obstacle recognizer 210 to determine the obstacle is stored, and obstacle information for the detected obstacle is stored.

In the data unit 280, data for recognizing an object such as a user or the companion animal may be stored, sound data for dividing the input sound may be stored, and data for dividing various accidents and performing operations corresponding to the accidents may be stored.

Moreover, in the data unit 280, control data for controlling the operation of the moving robot, data for a cleaning mode of the moving robot, and a detection signal such as sound/laser detected by the sensor unit 150 are stored.

The data unit 280 stores data which can be read by a microprocessor, and may include a Hard Disk Drive (HDD), a Solid State Disk (SSD), a Silicon Disk Drive (SDD), a ROM, a RAM, a CD-ROM, a magnetic tape, a floppy disk, and an optical data storage device.

The communicator 270 communicates with a terminal 300 in a wireless communication method. Moreover, the communicator 270 is connected to an Internet network via an in-home network and may communicate with an external server or the terminal 300 controlling the moving robot.

The communicator 270 transmits the generated map to the terminal 300, receives the cleaning command from the terminal, and transmits data regarding the operating state and the cleaning state of the moving robot to the terminal. In addition, the communicator 270 may transmit information on the obstacle detected during the traveling to the terminal 300 or the server.

The communicator 270 may transmit data such as a predetermined warning message corresponding to the sound generated in the area and the capture image to the terminal of the designated user.

Moreover, the communicator 270 may transmit a predetermined message to an external terminal, a service center, a repair center, a report center, or the like, or connect a report phone.

The communicator 270 includes short-range wireless communication such as a ZigBee or a Bluetooth and a communication module such as Wi-Fi and WiBro to transmit and receive data.

Meanwhile, the terminal 300 is a device which includes a communication module to be connectable to the network and has a program for controlling the moving robot or an application for controlling the moving robot, and a device such as a computer, a laptop, a smartphones, a PDA, or a tablet PC may be used as the terminal 300. In addition, the terminal may also use a wearable device such as a smart watch.

The terminal 300 may output a predetermined warning sound or display a received image according to the data received from the moving robot 1.

The traveler 250 includes at least one driving motor so that the moving robot travels according to the control command of a traveling controller 230. As described above, the traveler 250 may include a left wheel driving motor rotating a left wheel and a right wheel driving motor rotating a right wheel.

The cleaner 260 operates the brushes so that the dust or the foreign substances around the moving robot can be easily sucked, and operates the suction device to suck the dust or foreign substances. The cleaner 260 controls the operation of the suction fan provided in the suction unit which sucks the foreign substances such as dust or garbage so that the dust is introduced into the foreign substances collection container through the suction port.

In addition, the cleaner 260 is installed at a rear of a bottom surface of the main body, and may further include a damp floorcloth cleaner (not illustrated) which mops the bottom surface in contact with the bottom surface and a water bucket (not illustrated) which supplies water to the damp floorcloth cleaner. A cleaning tool may be mounted on the cleaner 260. For example, a mop pad is mounted on the damp floorcloth cleaner to clean the bottom surface. The cleaner 260 may further include a separate driving means for transmitting a rotational force to a damp mop pad of the damp floorcloth cleaner.

The battery (not illustrated) supplies not only the power required for the driving motor, but also the power required for the entire operation of the moving robot 1. When the battery is discharged, the moving robot 1 can travel to be returned to the charging stand for charging, and during the return traveling, the moving robot 1 can self-detect a location of the charging stand. The charging base may include a signal transmitter (not illustrated) which transmits a predetermined return signal. The return signal may be an ultrasonic signal or an infrared signal, but is not limited thereto.

The sensor unit 150 includes a plurality of sensors to detect the obstacle. The sensor unit 150 uses at least one of an ultrasound sensor, a laser sensor, and an infrared ray sensor to detect an obstacle in a forward direction, that is, the traveling direction. The sensor unit 150 may detect a location of or a distance to an obstacle located in the traveling direction based on the sensor signal.

In addition, the sensor unit 150 may further include a cliff detection sensor which detects the presence of a cliff on the bottom in the traveling area. When the transmitted signal is reflected and incident to the sensor unit 150, the sensor unit 150 inputs information on the existence of the obstacle or the distance to the obstacle as the obstacle detection signal to the controller 200.

The sensor unit 150 includes at least one inclination sensor to detect the inclination of the main body. The inclination sensor calculates an inclined direction and angle when inclined in the front, rear, right, and right directions of the main body. The inclination sensor may use a tilt sensor, an acceleration sensor, or the like, and in a case where the inclination sensor is an acceleration sensor, any of a gyro type sensor, an inertial type sensor, and a silicon semiconductor type sensor can be applied.

In addition, the sensor unit 150 may detect an operation state or an abnormality through a sensor installed inside the moving robot 1.

The image acquirer 100 may include a camera which converts an image of a subject into an electrical signal, and then converts the electrical signal into a digital signal to store the digital signal in a memory element. The camera may include at least one optical lens, and an image sensor (for example, a CMOS image sensor) which is configured to include a plurality of photodiodes (for example, pixels) imaged by light passing through the optical lens, and a Digital Signal Processor (DSP) which constitutes an image based on a signal output from light diodes. The digital signal processor can generate not only a still image but also a moving image including frames configured of still images.

The image sensor is a device which converts the optical image into an electrical signal and includes a chip in which a plurality of photo diodes are integrated. For example, a pixel is the photodiode. Charges are accumulated in each pixel by an image formed on the chip by light passing through the lens, and the charges accumulated in the pixels are converted into electrical signals (for example, voltage). As the image sensor, a Charge Coupled Device (CCD), a Complementary Metal Oxide Semiconductor (CMOS), or the like is well known.

The image acquirer 100 continuously captures an image when the moving robot is operated. In addition, the image acquirer 100 may capture an image at a predetermined period or a predetermined distance unit. The image acquirer 100 may capture an image when an obstacle is detected by the sensor unit 150, and may also capture an image in a movement state or a cleaning state in which an obstacle is not detected.

The image acquirer 100 may set a capturing cycle according to a movement speed of the moving robot. In addition, the image acquirer 100 may set the capturing cycle in consideration of the detection distance by the sensor unit and the movement speed of the moving robot.

The image acquirer 100 not only acquires an image in front of the traveling direction, but can also capture the ceiling shape of the top in the traveling direction.

The image acquirer 100 stores the image captured while the main body travels in the data unit 280, as the image data.

The sensor unit 150 may input a detection signal for an obstacle detected by the provided sensor to the controller. The image acquirer 100 inputs the captured image to the controller.

The controller 200 controls the traveler 250 so that the moving robot travels within a designated area of the traveling area.

The controller 200 processes the data input by the operation of the operator 160 to set the operation mode of the moving robot, outputs the operation state through the output unit 190, and outputs the warning sound, the sound effect, and the voice guidance according to the operation state, the error state, or the detection of the obstacle through a speaker of the output unit 190.

The controller 200 generates a map for a traveling area based on the image acquired from the image acquirer 100 or the obstacle information detected from the sensor unit 150. The controller 200 generates a map based on obstacle information during the traveling in the area, but may determine the shape of the traveling area from the image of the image acquirer to generate the map.

The controller 200 analyzes the sound input from the audio input unit 120 to determine the type of the sound. The controller 200 may determine a sound generation point, an object which generates the sound, or a cause of a sound generation.

The controller 200 performs a control to execute a specified operation according to the type of the sound and the operation mode. The controller 200 controls the main body to move to the sound generation point, and performs a specified operation according to the type of the sound.

For example, when the controller determines that water runs out in a sink while there is no occupant, the controller 200 determines the sound of the water through the detected sound, moves the main body, and then captures an image and transmits the captured image the terminal 300 of the user. In addition, when the controller 200 detects an intrusion, the controller 200 may transmit a warning to the user terminal, and generate and transmit an intrusion warning to a police station or a security company.

The controller 200 controls the traveler such that the traveler recognizes an obstacle with respect to the obstacle detected from the image acquirer 100 or the sensor unit 150 and performs a specific operation or moves to change a path according to the recognized obstacle. In addition, the controller may output a predetermined sound effect or warning sound through the output unit, if necessary, and may control the image acquirer such that the image acquirer captures an image.

The controller 200 controls the traveler 250 and the cleaner 260 during the traveling so that the traveler 250 and the cleaner 260 absorb the dust or foreign substances around the moving robot, and thus, the cleaning with the respect to the traveling area is performed. Accordingly, the cleaner 260 operates the brush so that the dust or foreign substances around the moving robot is easily sucked, and operates the suction device to suck the dust or foreign substances. The cleaner is controlled to suck the foreign substances during the traveling so as to perform the cleaning.

The controller 200 checks a charging capacity of the battery to determine a time when the battery is to be returned to the charging stand. When the charging capacity reaches a certain value, the controller 200 stops the operation being performed and starts searching the charging stand to return to the charging stand. The controller 200 may output a notification regarding the charging capacity of the battery and a notification regarding returning to the charging stand. In addition, the controller 200 may return to the charging stand when a signal transmitted from the charging stand is received through the communicator 270.

The controller 200 includes an obstacle recognizer 210, a map generator 220, a travel controller 230, a sound recognizer 240, and an image processor 290.

The map generator 220 generates a map for the area based on obstacle information while traveling the area during an initial operation or when a map for the area is not stored. In addition, the map generator 220 updates the previously generated map based on the obstacle information obtained during the traveling. The map generator 220 analyzes the image acquired during the traveling to determine the shape of the area to generate the map.

After the map generator 220 generates a basic map, the map generator 220 divides the cleaning area into a plurality of areas, includes a connection passage connecting the plurality of areas to each other, and generates a map including information on the obstacles in each area.

The map generator 220 processes the shape of the area for each divided area. The map generator 220 may set properties for a divided area.

Moreover, the map generator 220 may divide the area from features extracted from the image. The map generator 220 may determine the location of the door based on the connection relationship of the features, and therefore, divide a boundary between the areas to generate a map constituted by a plurality of areas.

The obstacle recognizer 210 determines the obstacle through the data input from the image acquirer 100 or the sensor unit 150.

The obstacle recognizer 210 calculates the direction of the obstacle or the distance to the obstacle according to the detection signal of the sensor unit 150, for example, a signal such as the ultrasound or the laser. Moreover, the obstacle recognizer 210 analyzes an acquired image including the pattern to extract the pattern, and analyzes the shape of the pattern to determine the obstacle. When the obstacle recognizer 210 uses the ultrasonic or infrared signal, the type of the received ultrasound and a receiving time of the ultrasound are changed according to the distance to the obstacle or the location of the obstacle. Accordingly, the obstacle recognizer 210 determines the obstacle based on the distance to the obstacle or the location of the obstacle.

The obstacle recognizer 210 can detect a human body. The obstacle recognizer 210 analyzes the data input through the image acquirer 100 to detect the human body based on a silhouette, a size, a face shape of the human body, and determines whether or not the corresponding human body is a specific user. The obstacle recognizer 210 may store data of a pre-registered user. For example, the obstacle recognizer 210 may store an image of the user and features according to a shape of the user as data to determine whether or not the user is a registered user.

The obstacle recognizer 210 may also recognize the companion animal.

In addition, the obstacle recognizer 210 recognizes devices such as home appliances, household goods, doors, and sinks.

The obstacle recognizer 210 analyzes the image data to extract the feature of the obstacle and determines the obstacle based on the shape, the size, and the color of the obstacle so as to determine the location of the obstacle.

The obstacle recognizer 210 may determine the type of the obstacle by extracting the feature of the obstacle based on the previously stored obstacle data, except for a background of the image from the image data. The obstacle data is updated by new obstacle data received from the server. The moving robot 1 may store obstacle data for the detected obstacle and receive data about the type of the obstacle from the server for other data.

In addition, the obstacle recognizer 210 stores the recognized obstacle information in the obstacle data, and also transmits recognizable image data to the server through the communicator 270 to determine the type of the obstacle. The communicator 270 transmits at least one image data to the server.

The image processor 290 pre-processes the image input from the image acquirer 100 and then analyzes the image. The image processor 290 extracts the features from the captured image and analyzes the subject captured in the image.

The image processor 290 compresses and converts the captured image. The image processor 290 may convert the image into a designated image format for transmission to the terminal 300 or the server.

In some cases, the image processor 290 may be included in the obstacle recognizer 210. As described above, the obstacle recognizer 210 may operate as the image processor as the obstacle recognizer 210 recognizes the obstacle from the image.

The sound recognizer 240 analyzes the sound input from the audio input unit 120 to determine the type of the sound. The sound recognizer 240 may determine the type of the sound based on information such as the size, the wavelength, and the frequency of the sound, and a direction in which the sound is generated. The sound recognizer 240 determines the sound generation point, a cause of the sound, or the object which generates the sound, according to the type of the sound.

The sound recognizer 240 applies the result for the sound generation point to the travel controller 230, and accordingly, the travel controller 230 controls to travel to the surrounding area based on the sound generation point.

In addition, the sound recognizer 240 may determine the cause of the sound or the object which generates the sound, based on pre-stored data.

For example, the sound recognizer 240 divides a crying sound of a baby, a coughing sound, and a crying sound of a companion animal to determine the object which generates the sound. In addition, the sound recognizer 240 can divide a sound of glass window breaking, a button sound of a door lock of a front door, a sound when a door is opened or closed, a radio sound, a warning sound, TV sound, or the like.

In addition, when a voice is registered for each user, the sound recognizer recognizes the user's voice to identify the user.

The sound recognizer 240 may include a signal processor which filters and amplifies the sound collected through the audio input unit 120.

The travel controller 230 controls the traveler 250 such that the traveler 250 travels the area based on the map, changes the moving direction or traveling path in response to the detected obstacle information, or passes through the obstacle or avoids the obstacle.

The travel controller 230 controls the traveler 250 to move to the area set based on the map generated by the map generator 220 or to move a main body within the set area. In addition, the travel controller 230 controls the traveler so that the traveler performs a predetermined operation or travels to change the traveling path in response to the obstacle.

The travel controller 230 controls the traveler 250 to move to the area set based on the map generated by the map generator 220 or to move a main body within the set area. In addition, the travel controller 113 controls the traveler so that the traveler performs a predetermined operation or travels to change the traveling path in response to the obstacle.

The travel controller 230 controls the traveler so that the traveler performs at least one of avoidance, approaching, setting of an approach distance, stopping, deceleration, acceleration, a reverse travel, U-turn, and changing the travel direction in response to the detected obstacle.

In addition, the travel controller 230 outputs an error and may output a predetermined warning sound or voice guidance as needed.

The travel controller 230 controls the main body so that the main body moves to the sound generation point or a point adjacent to the sound generation point in response to the signal input from the sound recognizer 240.

When the main body reaches the sound generation point, the image acquirer 100 captures an image. The traveler 250 may rotate at a predetermined speed while the image acquirer performs the capturing, and may also rotate the main body at a designated rotation angle unit.

The controller 200 transmits a notification to the terminal of the user about a determination result of the sound recognizer 240. In addition, the controller may transmit related sound data or image data of the captured image.

The controller 200 performs a control so that the specified operation is performed according to the operation mode and the type of the sound. In addition, the controller 200 controls the main body so that the main body performs a predetermined operation based on the sound collected through the audio input unit even in a normal mode in which a specific operation mode is not set.

The controller 200 allows a specified operation to be performed when an operation is specified for a specific sound or a specific object. The controller may perform different operations according to the object and sound generation point of the sound generated by the sound recognizer.

For example, when the child is crying, the controller can play a lullaby and output the lullaby through the speaker. When the companion animal barks, the controller may output a pre-recorded voice of the user or connect the call to the terminal of the user through the communicator. In addition, the controller may turn on the TV so that a broadcast of a specific channel is output.

Meanwhile, when the TV is turned on in a living room in a state where there is no occupant in the living room, the controller detects the sound of the TV to transmit an OFF signal adjacent to the TV. When the TV is connected to the network, the controller may turn off the power so that the TV is turned off through the network connection. In addition, when the controller detects an intrusion, the controller may move to the corresponding location, capture an image, transmit the image to the terminal, and transmit the intrusion warning to a designated police station or security company.

The controller 200 may control the image acquirer to capture an image, output a warning sound through the output unit, and transmit a warning message through the communicator.

FIG. 4 is a diagram for explaining a signal flow according to an operation of the moving robot according to the embodiment of the present disclosure.

As illustrated in FIG. 4, the moving robot 1 collects the sound through the audio input unit 120 during the traveling or waiting (S11).

The moving robot 1 may store the collected sound and analyze the sound to determine the type of the sound. The moving robot 1 can determine the object which generates the sound or the location where the sound is generated. In addition, the moving robot (1) may move to the sound generation point to capture an image and output a predetermined warning.

The moving robot 1 generates the captured image or a predetermined notification message and transmits it to the designated terminal 300 (S12).

The terminal 300 outputs a warning based on the received notification message (S13), and also displays the received image.

The terminal 300 may transmit a control command to the moving robot 1 in response to the input of the user (S14). For example, the terminal may transmit the control commands such as additional video capturing, a warning sound output, standby, and a movement to the moving robot.

In addition, the moving robot 1 may report to a relevant institution according to the type of the sound. For example, the moving robot 1 may report to a security company, a police station, a fire department, or the like (S15). When an intrusion occurs, the moving robot may report to the police station, and when a fire occurs, the moving robot may report to the fire department. The report can be transmitted in a report message or a separate report form to a server 350 of the security company, the police station, the fire department, or the like through a linkage program.

The server 350 receives the report, transmits the report (S17) to an institution 380, such as a police station or a fire department, adjacent to where the accident occurs, and causes the police or firefighters to dispatch (S18). In addition, the moving robot may report directly to the security company, the police station, and the fire department located adjacent to the moving robot.

The moving robot 1 may transmit the report and matters related to the dispatch of related personnel to the terminal to report the progress.

FIG. 5 is a flowchart illustrating a method in which the moving robot according to the embodiment of the present disclosure detects a sound and controls an operation.

As illustrated in FIG. 5, the moving robot 1 detects and collects the sound through the audio input unit 120 (S210). The controller 200 filters and amplifies the collected sound.

The controller 200 analyzes the sound to determine determines the type of the sound. The controller 200 checks the currently set operation mode of the moving robot 1 and analyzes a situation in the area according to the type of the sound. The sound recognizer 240 of the controller 200 analyzes the sound to determine the type of the sound.

The controller 200 may determine the sound generation point and the object which generates the sound, as the type of the sound.

For example, it may be determined whether the sound is generated from the home appliances, doors, windows, or the like, or the sound of a person or the sound of the companion animal may be divided to determine the type of the sound. In addition, the sound generation point may be a sound generation point, a room where the sound occurs, a small area, or a location adjacent to the sound generation point.

The controller 200 generates a notification message according to the type of the sound and transmits the generated notification message to the terminal 300 (S240).

In addition, the travel controller 230 of the controller 200 controls the traveler 250 so that the traveler 250 moves to the sound generation point (S250). The moving robot 1 may move to the sound generation point, that is, the sound generation point, the room where the sound occurs, the small area, or the location adjacent to the sound generation point.

When the moving robot 1 reaches the sound generation point, the controller 200 applies a control command to the image acquirer 100, and the image acquirer 100 captures an image in response to the control command (S260).

The traveler 250 may rotate at a predetermined speed at the sound generation point or stop after rotating at a predetermined rotation angle unit according to the control command of the travel controller 230. The image acquirer 100 may capture the image in at least one of a still image, a moving image, and a panorama.

The controller 200 may analyze the image and determine the intrusion situation or a dangerous situation (S270). In addition, the controller 200 may determine a life noise.

The controller 200 may recognize the object (subject) through the obstacle recognizer 210 or the image processor 290 with respect to the image captured through the image acquirer 100 to determine whether the situation is an intrusion situation or an emergency situation.

The controller 200 determines the intrusion situation and the dangerous situation according to a result of an image analysis in conjunction with the currently set mode. For example, in a case where a moving person which is not recognizable is detected or a window is broken in a state where the security mode is set, the situation can be determined as an intrusion situation. In addition, the controller 200 may analyze the image to determine whether a fire has occurred.

If the situation is determined to be the intrusion situation or the emergency situation, the controller 200 also transmits the captured image to the terminal 300 with a notification message.

In addition, the controller 200 may output a predetermined warning sound and report the warning sound to the designated institution (S280). When the reporting is performed, the controller 200 may transmit information on the detected sound and the captured image to the server (S290).

The controller 200 may transmit data to the server of the security company, the police station, the fire department, or the like according to the generated situation, report the intrusion or emergency situation, or connect a call to the corresponding institution and output a designated voice guidance.

Meanwhile, when a control command is received from the terminal 300 in response to the transmitted notification, the controller 200 is operated according to the control command (S300). For example, the controller 200 may output the warning sound in the area when the control command according to the warning sound output is received.

Meanwhile, in the case of the life noise, when the sound is a sound generated by the occupant, the moving robot 1 may transmit an image to the terminal and perform a specified operation according to a control command of the terminal.

FIGS. 6A to 6C are views illustrating an embodiment of an operation according to the security mode setting of the moving robot according to the embodiment of the present disclosure.

As illustrated in FIG. 6A, when a sound occurs in a window P1 of a seventh area A7 of indoor areas, or when the sound occurs in a front door P2 of a ninth area A9, the moving robot 1 detects and analyzes the sound to determine the type of the sound. The sounds are illustrated together for convenience of explanation. However, it should be understood that respective sounds do not occur at the same.

The moving robot 1 can detect the sound generated within the area even when the moving robot 1 is changed on the charging stand PO or the moving robot travels.

The moving robot 1 can determine the sound generation point as a veranda, and can determine the sound as a sound of the winddown. The window sound can be divided into a sound when the window is opened or closed, or a sound when the window is broken.

Moreover, when the sound is generated from the front door, the moving robot 1 collects the corresponding sounds to determine the sound generation point to the sound generation point for the ninth area A9 of the front door. For example, the sound when the front door is opened or closed and the button sound of the door lock are determined and divided.

When the sound is generated in the ninth area in the state where the security mode is set, the moving robot 1 collects the sounds of the ninth area and determines the sounds. Meanwhile, the moving robot 1 may ignore the sound of the front door generated in the ninth area in a state where the security mode is canceled.

As illustrated in FIG. 6B, the moving robot 1 sets moving paths L1 and L2 having the sound generation point as a destination, and moves to each sound generation point. The moving robot 1 moves to the sound generation point. However, since the moving robot 1 cannot enter a seventh area A7 of the veranda, the moving robot 1 moves to an adjacent fifth area A5. In addition, the moving robot 1 can move to a point adjacent to the ninth area A9 of the front door.

As illustrated in FIG. 6C, when the moving robot 1 moves along the respective movement paths L1 and L2 and reaches the sound generation point, the moving robot 1 captures an image. The moving robot 1 captures the image in the seventh area and the ninth area, respectively.

When the moving robot 1 reaches the sound generation point and detects the obstacle or an intruder, the moving robot 1 may capture an image in the corresponding direction to capture the obstacle or the intruder as the subject. The moving robot 1 can capture and store an image even if a separate obstacle or intruder is not detected.

In addition, when the moving robot 1 detects a new obstacle or a human body while moving to a sound generation point, the moving robot 1 may capture an image.

In a case where the moving robot 1 detects an obstacle which is not included in the map at the sound generation point or while moving the sound generation point, the moving robot 1 may capture an image to detect a human body which is not registered.

The moving robot 1 transmits the captured image to the terminal 300 so that the user can check the situation in the area.

FIG. 7 is a flowchart illustrating a control method according to the security mode setting of the moving robot according to the embodiment of the present disclosure.

As illustrated in FIG. 7, the moving robot 1 detects a sound (S310) and analyzes the detected sound.

The moving robot 1 determines whether the currently set mode is a method mode (S320). In addition, the moving robot 1 may determine whether the situation is the intrusion state according to the analysis result of the detected sound, that is, the type of the sound, in a state in which the security mode is set (S330).

For example, in a case where the sound of the door or the window being opened, the sound of the window being broken, and the button sound of the door lock is generated when the security mode is set, the situation may be determined to be the intrusion situation. When the security mode is canceled, the button sound of the door lock, the sound when the door is opened or closed, or the like can be ignored.

If the mode is not the security mode and the situation is not the intrusion situation, it is determined whether the noise is the life noise or the noise caused by the occupant (A).

According to a result of analyzing the sound, if it is determined that the situation is the intrusion situation is in the state where the security mode is set, the moving robot 1 moves to the sound generation point (S350). Before and after the moving robot moves to the sound generation point, the moving robot may generate a notification or warning to transmit the notification or warning to the terminal 300 (S340).

When the moving robot 1 reaches the sound generation point, the image acquirer 100 is operated to capture an image (S360).

The image acquirer 100 may capture a plurality of images at predetermined time intervals. In addition, the image acquirer 100 may capture any one of a moving image, a panoramic image, or a plurality of still images while the main body rotates.

The controller 200 may control the image acquirer so that the image acquire detects the movement within an area in response to a detection signal of the sensor unit, and captures an image in a direction in which the movement is detected.

The controller 200 may transmit the captured image to the terminal 300.

The image processor 290 of the controller 200 analyzes the captured image (S370), and the obstacle recognizer 210 determines whether there is the intruder from the image (S380). In addition, the controller 200 may determine whether an intrusion occurs according to the control command received from the terminal 300 in response to the previously transmitted image.

The controller 200 may compare the captured images at predetermined time intervals, determine movement, and recognize the human body in the images to determine the intruder. In addition, the controller 200 may determine whether the human body of the image is a pre-registered human body or the intruder through face recognition.

If it is determined to be an intruder, the controller 200 outputs a warning sound through the output unit (S390). Moreover, the controller 200 may report the intruder through communicator (S400).

In addition, if the human body is not the intruder, the controller cancels the intrusion situation (S410). In some cases, the controller cancels the intrusion situation according to a control command received from the terminal.

FIGS. 8A to 8C are views illustrating an embodiment of an operation of the moving robot according to the embodiment of the present disclosure with respect to the life noise.

As illustrated in FIG. 8A, within the area, the moving robot detects a sound generated in a kitchen P3 of the fifth area A5 or a bathroom P4 in a tenth area A10.

The moving robot 1 can divide a sound by cooking utensils of the kitchen and a sound of water in the bathroom based on the collected sound to determine the location of the sound. When the moving robot 1 detects the wound of the water, the moving robot 1 may extract that the location of the sound is the kitchen or the bathroom.

As illustrated in FIG. 8B, when a sound is generated in the fifth area A5, the moving robot 1 moves to the fifth area along the third movement path L3.

Moreover, when the sound of the water is generated in the tenth area A10, the moving robot 1 moves to the tenth area along a fourth movement path L4.

The moving robot 1 may move to the sound generation point according to the presence or absence of the occupant or the setting of the outgoing mode. In addition, even if there is the occupant in the normal mode, the moving robot 1 may move to the sound generation point when the same sound occurs for a predetermined time or longer.

As illustrated in FIG. 8C, the moving robot 1 captures an image through the image acquirer 100 for the fifth area A5 and the tenth area A10, respectively.

When the moving robot 1 does not enter the tenth area, the moving robot 1 may capture an image for the tenth area at an adjacent fourth point P4a.

The moving robot 1 transmits the captured image to the terminal and analyzes the image to determine whether the situation is the emergency situation.

For example, if contents of a pot boil over in the kitchen or a burner such as a gas stove is operated, a warning sound may be output. If the burner is operated in a situation where the human body is not detected in the kitchen, a warning message may be transmitted to the terminal.

In addition, if it is determined that a fire occurs, not only a warning is output through the output unit, but the fire can be reported to the fire department through a communicator.

In the case of the sound of the water, the moving robot outputs a warning sound and can also transmit the image for the tenth area to the terminal to transmit a notification message indicating that the water runs out.

Meanwhile, when the moving robot moves to the fifth area or the tenth area and a human body is detected in the corresponding area, the moving robot may ignore the collected sound and may be returned to the charging stand.

FIG. 9 is a flowchart illustrating a control method of the moving robot according to the embodiment of the present disclosure with respect to the life noise.

As illustrated in FIG. 9, the moving robot 1 analyzes a detected sound (S430) to determine the type of the sound.

The moving robot 1 determines whether the detected sound is the life noise (S440).

In addition, when the sound is not the life noise, the moving robot may determine whether the situation is the intrusion situation described above.

When the noise is the life noise, the moving robot 1 determines whether the mode is the outgoing mode (S450). Moreover, the moving robot determines whether there is an occupant (S460).

When the outgoing mode is set and there is no occupant, if the life noise is detected, the moving robot 1 determines that the situation is abnormal, the moving robot 1 may transmit the notification to the terminal 300 (S470).

The moving robot 1 moves to the sound generation point (S480), and captures an image for the sound generation point (S490). In addition, the moving robot 1 can determine the emergency situation based on the detection signal of the sensor unit.

The moving robot 1 analyzes the image and determines whether the situation is the emergency situation (S500). For example, the moving robot 1 may analyze the image to determine whether a fire occurs. In addition, the moving robot 1 can determine whether the situation is the emergency situation based on the detection signal detected from the sensor unit. For example, a fire sensor may be used to determine whether a fire occurs.

The moving robot 1 divides the emergency situation such as the fire and the abnormal situation, when the situation is the emergency situation, the moving robot reports the emergency situation (S510), and transmits a notification for the emergency situation to the terminal (S520). A criterion between the emergency situation and the abnormal situation can be changed by the setting of the user.

Meanwhile, in the case of the abnormal situation, for example, in a case where the water runs out in the bathroom, the moving robot determines that the situation is the abnormal situation, transmits the image to the terminal, and performs a specified operation.

In addition, when TV is turned on in the outgoing mode, the moving robot 1 may transmit a notification and turn off the power to turn off the TV. When the TV is connected to the network, the operation of the TV can be controlled through a network connection.

Meanwhile, in a case where a separate operation mode is not set, when the moving robot 1 detects the sound of the TV, the moving robot may control the suction force or the rotation of the brush according to a distance to the TV so as to reduce the noise generated from the main body.

In case where the moving robot detects the sound of TV or a music during the cleaning, when the moving robot enters a predetermined distance from the TV, the audio device, or a speaker, the moving robot reduce the noise generated from the main body. The moving robot may reduce the moving speed, the suction force, and the rotation of the brush to reduce the noise.

For example, the moving robot 1 sets the rotation of the brush having the suction force of 20,000 to 500 within 5 m from the TV, sets the rotation of the brush having the suction force of 34,000 to 700 in a range of 5 m to 10 m from the TV, and sets the rotation of the brush having the suction force of 45,000 to 1,000 in a range of 10 m or more from the TV so that the degree of the sound can be adjusted according to a distance from the object generating the sound, that is, a distance to the TV or the audio device.

FIGS. 10A to 10C are views illustrating an embodiment of an operation when the moving robot according to the embodiment of the present disclosure detects an occupant.

As illustrated in FIG. 10A, the moving robot detects the noise generated in the area. The moving robot 1 may be operated as follows in a human care mode.

When the cough sound is generated in the fourth area A4, the moving robot 1 may analyze the detected sound and determine that the type of the sound is a person's cough sound. In some cases, the moving robot 1 can divide the point where the cough sound occurs based on the information of each room.

In addition, when a puppy barks in the first area A1, the moving robot 1 may analyze the detects sound and determine that the type of the sound is the sound of the companion animal.

Further, when a cry sound of a baby is generated in the second area A2, the moving robot 1 may detect the sound and determine that the type of the sound is the baby's cry.

The moving robot determines the type of the sound based on the pre-stored data. The moving robot 1 may analyze the feature of the detected sound and determine the type of the sound based on the size, the wavelength, and the frequency of the sound.

The moving robot 1 may determine the sound generation point based on the direction in which the sound occurs. In addition, the moving robot 1 may set a reference degree according to the type of the sound based on the pre-stored data and determine the distance in response to the degree of the sound.

As illustrated in FIG. 10B, the moving robot 1 sets movement paths L5, L6, and L7 targeting the sound generation point and moves along the paths.

As illustrated in FIG. 10C, when the moving robot 1 moves to the sound generation point, the moving robot captures the image. The image can be captured in various forms such as a still image, a moving image, and a panoramic image.

The moving robot which has moved to the fourth area A4 may capture a human body O5 at a fifth point of the fourth area.

The moving robot which has moved to the second area A2 may capture an image of a crying baby.

The moving robot which has moved to the sixth point P6 may capture an image of the companion animal.

FIG. 11 is a flowchart illustrating a control method of the moving robot according to the embodiment of the present disclosure when the moving robot detects the occupant.

As illustrated in FIG. 11, the moving robot 1 detects and analyzes the sound collected through the audio input unit 120 (S550). The controller 200 may analyze the wavelength, the size, the frequency, and the pattern of the sound to determine the type of the sound.

The moving robot 1 can determine whether to move according to the operation mode and the type of the sound. When the human care mode is set, the moving robot 1 performs an operation in response to the occupant.

First, the moving robot 1 determines whether there is the occupant (S560), and the moving robot 1 is operated to be divided into the case where there is the occupant and the case where there is no occupant.

When the sound is detected in the situation in which there is the occupant, the moving robot 1 moves to the sound generation point (S570) and captures the image at the sound generation point (S580).

The moving robot 1 checks the object according to the occurrence of the sound (S590). The object is a source from which the sound is generated, and may be the person, the companion animal, or the home appliances.

When the object is a person, the controller 200 analyzes the image to classify whether the object is a human body or not, and divide the human body into the baby and the elderly person (S600 and S620). The controller 200 may determine whether the human is a registered user through the obstacle recognizer or the image processor to recognize the object.

When the object is a baby, as described above, in a case where the crying sound of the baby is generated in the second area, the controller 200 moves to the second area to capture the image of the baby, and thus, may check that the object is the baby through the sound and the image. When the moving robot moves based on the crying sound of the baby and determines that the object is the baby through the image, a predetermined music may be played (S610).

Moreover, the moving robot 1 may connect a call or output a recorded voice. When the call is connected, the moving robot 1 may be connected through a speaker, a TV, and a home terminal connected to the network.

The controller 200 may transmit the notification or the image to the terminal 300.

When the object is an elderly person, the controller 200 transmits the notification and the captured image to the designated terminal 300.

The controller 200 may determine whether the situation is an emergency situation through the image analysis (S640). For example, when the elderly person who is the object falls, falls down, or has no movement for a certain period of time, the controller 200 may determine that the situation is the emergency situation.

When the situation is determined to be the emergency situation, the moving robot 1 may report an accident to a 119 paramedic or a hospital (S660).

When, when the companion animal is detected (S650), the moving robot 1 may transmit a notification and image, and connect a call with a registered terminal.

When a control command is received from the terminal, the moving robot 1 performs a specified operation according to the control command (S680). For example, the designated music may be played or a voice may be output.

Meanwhile, in an environment care mode, when a sound is detected in a situation where there is no occupant in the area, the moving robot 1 determines that the sound is a sound output from the home appliances, for example, a TV, a radio, or an audio device, according to the type of the sound (S590).

When the sound is the sound of TV, the moving robot moves to the sound generation point, and causes the power of the TV to be turned off through the network connection (S700).

The moving robot according to the present embodiment operated as described above may be implemented by a form of an independent hardware device, and may be driven in a form included in other hardware devices such as a microprocessor or general-purpose computer system as at least one processor.

The above description is merely illustrative of a technical idea of the present disclosure, and a person skilled in the art to which the present disclosure belongs will be able to make various modifications and variations within a scope which does not depart from the essential characteristics of the present disclosure. Therefore, the embodiment disclosed in the present disclosure is not intended to limit a technical spirit of the present disclosure but is to explain the present disclosure, and a scope of the technical spirit of the present disclosure is not limited by the embodiment.

The invention claimed is:

1. A moving robot comprising:
a main body configured to travel an area;
a sensor unit configured to include a plurality of sensors and detect an obstacle or a movement of the obstacle;
an audio input unit configured to collect a sound;
a sound recognizer configured to analyze the sound collected by the audio input unit and determine a type of the sound;
an image acquirer configured to capture an image; and
a controller configured to cause the main body to move to a sound generation point according to the type of the sound and an operation mode, analyze the image captured by the image acquirer at the sound generation point to determine an indoor situation, and perform an operation corresponding to the determined indoor situation, and
wherein the sound recognizer is configured to determine the type of the sound and an object which generates the sound through at least one of a degree of the sound, a direction in which the sound is generated, a frequency of the sound, and a pattern of the sound,
wherein the controller is configured to control to perform an operation corresponding to the determined type of the sound and the object which generates the sound,
wherein the indoor situation is an abnormal situation, an emergency situation, or an intrusion situation.

2. The moving robot of claim 1, wherein when the controller detects the sound, the controller generates a notification corresponding to the type of the sound or a notification including the image to transmit a warning sound to a designated terminal.

3. The moving robot of claim 1, wherein, when the sound detected by the audio input unit maintains for a certain period of time in a normal mode, the controller moves the moving robot to the sound generation point and captures the image through the image acquirer.

4. The moving robot of claim 1, wherein during cleaning by the moving robot, the controller controls operations of a suction unit and a brush according to a distance to the sound generation point in response to the sound detected by the audio input unit.

5. The moving robot of claim 1, wherein when the type of the sound is a life noise, the controller outputs a warning sound when there is no occupant at the sound generation point and the moving robot waits or is returned to an existing location when there is an occupant at the sound generation point.

6. The moving robot of claim 1, wherein when the controller detects a life noise in an outgoing mode, the controller determines that the indoor situation is the abnormal situation and moves the moving robot to the sound generation point, and
when an operation sound by home appliances is detected in the outgoing mode, the controller ends operations of home appliances connected by a network.

7. The moving robot of claim 1, wherein the controller analyzes the image to determine whether there is a fire, and reports the fire when the fire occurs.

8. The moving robot of claim 1, wherein when a human body is detected from the image at the sound generation point, the controller recognizes a baby and an elderly person and outputs a designated sound effect or voice, and
the controller determines whether the indoor situation is emergent in response to the type of the sound and a movement of the human body, and reports the emergency situation.

9. The moving robot of claim 1, wherein the controller detects a companion animal from the image at the sound generation point and outputs a designated sound effect or voice.

10. The moving robot of claim 1, wherein when the sound is detected in a security mode, the controller moves the moving robot to the sound generation point and detects the movement of the obstacle through the sensor unit, captures the image through the image acquirer at a point at which the movement is detected, and determines that the indoor situation is the intrusion situation to report the intrusion situation to a designated institution.

11. A method of controlling a moving robot, comprising:
detecting, by an audio input unit, a sound generated in an area;
analyzing the sound to determine a type of the sound;
moving the moving robot to a sound generation point according to the type of the sound and an operation mode;
capturing an image at the sound generation point; and
analyzing the image to determine an indoor situation and performing an operation corresponding to the determined indoor situation,
wherein the analyzing the sound to determine the type of the sound includes determining the type of the sound and an object which generates the sound through at least one of a degree of the sound, a direction in which the sound is generated, a frequency of the sound, and a pattern of the sound,
wherein the performing the ding to the determined indoor situation includes performing an operation corresponding to the determined type of the sound and the object which generates the sound, and
wherein the indoor situation is an abnormal situation, an emergency situation or an intrusion situation.

12. The method of controlling a moving robot of claim 11, further comprising:
generating a notification corresponding to the type of the sound or a notification including the image to transmit a warning sound to a terminal.

13. The method of controlling a moving robot of claim 11, further comprising:

when the sound detected by the audio input unit maintains for a certain period of time in a normal mode, moving the moving robot to the sound generation point to capture the image; and during cleaning by the moving robot, controlling operations of a suction unit and a brush according to a distance to the sound generation point in response to the sound detected by the audio input unit.

14. The method of controlling a moving robot of claim 11, further comprising:

when the type of the sound is a life noise, detecting whether or not there is an occupant and moving the moving robot to the sound generation point when there is no occupant; and returning the moving robot to an existing location when there is the occupant.

15. The method of controlling a moving robot of claim 11, further comprising:

when a life noise is detected in an outgoing mode, determining that a situation is the abnormal situation and moving the moving robot to the sound generation point, and when an operation sound by home appliances is detected in the outgoing mode, ending operations of home appliances connected by a network.

16. The method of controlling a moving robot of claim 11, further comprising:

analyzing the image to determine whether there is a fire;

outputting a warning when the fire occurs; and reporting the fire.

17. The method of controlling a moving robot of claim 11, further comprising:

when a human care mode is set, detecting a human body from the image at the sound generation point and recognizing a baby and an elderly person;

outputting a designated sound effect or voice corresponding to the human body;

determining whether the indoor situation is emergent in response to the type of the sound and a movement of the human body; and reporting the emergency situation.

18. The method of controlling a moving robot of claim 11, further comprising:

detecting a companion animal from the image; and outputting a designated sound effect or voice corresponding to the companion animal.

19. The method of controlling a moving robot of claim 11, further comprising:

detecting the movement of the obstacle for the sound generation point in a security mode;

capturing the image for a point at which the movement is detected;

determining that the indoor situation is the intrusion situation when a human body which is not registered at the sound generation point is detected; and reporting the intrusion situation to a designated institution.

* * * * *